US008831512B2

(12) United States Patent
Laws et al.

(10) Patent No.: US 8,831,512 B2
(45) Date of Patent: Sep. 9, 2014

(54) NEGOTIATING COMMUNICATION PARAMETERS BETWEEN NEAR FIELD COMMUNICATIONS (NFC) CAPABLE DEVICES (75) Inventors: Peter Laws, Swindon (GB); John Waters, Bath (GB)

(73) Assignee: Broadcom Corporation, Irvine, CA (US)

( * ) Notice: Subject to any disclaimer, the term of this patent is extended or adjusted under 35 U.S.C. 154(b) by 244 days.

(21) Appl. No.: 13/171,041

(22) Filed: Jun. 28, 2011

(65) Prior Publication Data
US 2013/0005244 A1    Jan. 3, 2013

(51) Int. Cl.
*H04B 7/00* (2006.01)

(52) U.S. Cl.
USPC ........ 455/41.1; 455/41.2; 455/39; 455/456.1; 455/452.2; 455/556.1; 455/272; 455/77; 455/226.1; 455/108; 340/10.1; 340/7.38; 340/572.7; 340/572.4; 340/572.8

(58) Field of Classification Search
USPC ........... 455/41.1, 41.2, 39, 456.1, 452.2, 269, 455/556.1, 272, 77, 226.1, 108; 340/10.1, 340/7.38, 572.7, 572.4, 572.8, 10.2, 426.1, 340/10.5
See application file for complete search history.

(56) References Cited

U.S. PATENT DOCUMENTS

| 5,905,372 | A | 5/1999 | Kuffner et al. |
| 6,337,877 | B1 * | 1/2002 | Cole et al. ...................... 375/222 |
| 6,946,950 | B1 * | 9/2005 | Ueno et al. .................... 340/10.1 |
| 7,916,776 | B2 * | 3/2011 | Bremer et al. ................ 375/222 |
| 8,314,687 | B2 * | 11/2012 | Gravelle et al. ............ 340/10.34 |
| 8,427,315 | B2 * | 4/2013 | Aiouaz et al. .............. 340/572.1 |
| 2004/0116074 | A1 * | 6/2004 | Fujii et al. ..................... 455/41.2 |
| 2011/0037575 | A1 | 2/2011 | Horst et al. |
| 2011/0127954 | A1 * | 6/2011 | Walley et al. ................. 320/108 |

FOREIGN PATENT DOCUMENTS

| CN | 1247630 A | 3/2000 |
| CN | 101499118 A | 8/2009 |
| EP | 2 267 634 A1 | 12/2010 |
| EP | 2 330 753 A1 | 6/2011 |
| WO | WO 99/31684 | 6/1999 |
| WO | WO 2010/065688 A1 | 6/2010 |

OTHER PUBLICATIONS

International Standard: ISO/IEC 21481, *Information technology—Telecommunications and information exchange between systems—Near Field Communication Interface and Protocol-2 (NFCIP-2)*, pp. 1-12, First edition, Reference No. ISO/IEC 21481:2005(E), ISO/IEC (Jan. 2005).
International Standard: ISO/IEC 18092, *Information technology—Telecommunications and information exchange between systems—Near Field Communication—Interface and Protocol (NFCIP-1)*, pp. 1-66, First edition, Reference No. ISO/IEC 18092:2004(E), ISO/IEC (Apr. 2004).
European Search Report for EP Patent Application No. EP12004703. 0, European Patent Office, Munich, Germany, mailed on Dec. 18, 2012.
Office Action for Chinese Patent Application No. 201210223454.6, mailed on Mar. 5, 2014.

* cited by examiner

*Primary Examiner* — Ganiyu A Hanidu
(74) *Attorney, Agent, or Firm* — Sterne, Kessler, Goldstein & Fox P.L.L.C.

(57) ABSTRACT

An apparatus and method is disclosed to negotiate communications parameters between near field communications (NFC) capable devices. In some embodiments, the NFC capable devices operate in a negotiation phase to negotiate one or more communications parameters prior to transferring information. In other embodiments, the NFC capable devices simultaneously negotiate the one or more communications parameters with the transferring of the information.

18 Claims, 8 Drawing Sheets

NEGOTIATING COMMUNICATION PARAMETERS BETWEEN NEAR FIELD COMMUNICATIONS (NFC) CAPABLE DEVICES

BACKGROUND

1. Field of Invention

The invention relates to near field communications (NFC), and more specifically to negotiating communication parameters between near field communications (NFC) capable devices.

2. Related Art

Conventional near field communication (NFC) devices are being integrated into mobile devices, such as smartphones to provide an example, to facilitate the use of these mobile devices in conducting daily transactions. For example, instead of carrying numerous credit cards, the credit information provided by these credit cards could be stored onto a conventional NFC device. The conventional NFC device is simply tapped to a credit card terminal to relay the credit information to it to complete a transaction. As another example, a ticketing writing system, such as those used in bus and train terminals, may simply write ticket fare information onto the conventional NFC device instead of providing a ticket to a passenger. The passenger simply taps the conventional NFC device to a reader to ride the bus or the train without the use of a paper ticket.

Generally, NFC requires that conventional NFC devices to be present within a relatively small distance from one another so that their corresponding magnetic fields can exchange information. Typically, a first conventional NFC device transmits or generates a magnetic field modulated with the information, such as the credit information or the ticket fare information, commonly referred to as a modulated data communication. This magnetic field inductively couples onto a second conventional NFC device that is proximate to the first conventional NFC device. The first conventional NFC device continues to generate the magnetic field without the information, commonly referred to as an unmodulated data communication, to allow the second conventional NFC device to harvest power from the magnetic field. The second conventional NFC device recovers, processes the information, and provides a response to the information transferred from the first conventional NFC device using this harvested power.

However, the first conventional NFC device may continue to provide the unmodulated data communication even after the second conventional NFC device has recovered, processed, and provided the response to the information. Consequentially, internal batteries of the first conventional NFC device may be unnecessarily depleted, a temperature of the first conventional NFC device and/or the second conventional NFC device may unnecessarily rise, security of the first conventional NFC device and/or the second conventional NFC device may unnecessarily be compromised, and/or unwanted interference for other communications devices that are proximate to the first conventional NFC device and/or the second conventional NFC device may be created.

Thus, there is a need for a way to dynamically negotiate one or more communication parameters between near field communications (NFC) capable devices that overcomes the shortcomings described above. Further aspects and advantages of the invention will become apparent from the detailed description that follows.

BRIEF DESCRIPTION OF THE DRAWINGS/FIGURES

Embodiments of the invention are described with reference to the accompanying drawings. In the drawings, like reference numbers indicate identical or functionally similar elements. Additionally, the left most digit(s) of a reference number identifies the drawing in which the reference number first appears.

The invention will now be described with reference to the accompanying drawings. In the drawings, like reference numbers generally indicate identical, functionally similar, and/or structurally similar elements. The drawing in which an element first appears is indicated by the leftmost digit(s) in the reference number.

DETAILED DESCRIPTION OF THE INVENTION

The following Detailed Description refers to accompanying drawings to illustrate exemplary embodiments consistent with the invention. References in the Detailed Description to "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the invention. Therefore, the Detailed Description is not meant to limit the invention. Rather, the scope of the invention is defined only in accordance with the following claims and their equivalents.

Embodiments of the invention may be implemented in hardware, firmware, software, or any combination thereof.

Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

The following Detailed Description of the exemplary embodiments will so fully reveal the general nature of the invention that others can, by applying knowledge of those skilled in relevant art(s), readily modify and/or adapt for various applications such exemplary embodiments, without undue experimentation, without departing from the spirit and scope of the invention. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

Although, the description of the present invention is to be described in terms of NFC, those skilled in the relevant art(s) will recognize that the present invention may be applicable to other communications that use the near field and/or the far field without departing from the spirit and scope of the present invention. For example, although the present invention is to be described using NFC capable communication devices, those skilled in the relevant art(s) will recognize that functions of these NFC capable communication devices may be applicable to other communications devices that use the near field and/or the far field without departing from the spirit and scope of the present invention.

An Exemplary Near Field Communications (NFC) Environment

Figure 1:
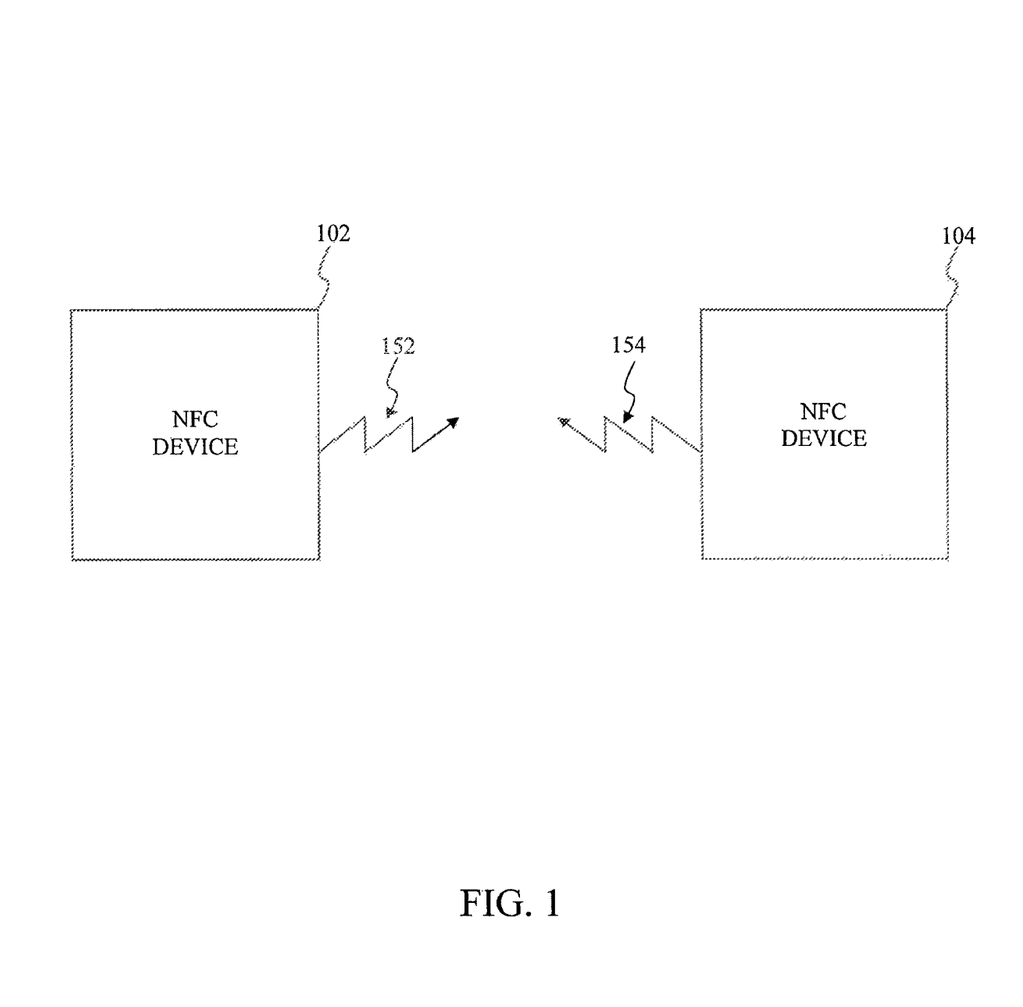
FIG. 1 illustrates a block diagram of a NFC environment according to an exemplary embodiment of the invention.

FIG. 1 illustrates a block diagram of a NFC environment according to an exemplary embodiment of the invention. A NFC environment 100 provides wireless communication of information among a first NFC device 102 and a second NFC device 104 that are sufficiently proximate to each other. The information may include one or more commands to be executed by the first NFC device 102 and/or the second NFC device 104, data from one or more data storage devices that is to be transferred to the first NFC device 102 and/or the second NFC device 104, or any combination thereof. The data storage devices may include one or more contactless transponders, one or more contactless tags, one or more contactless smartcards, any other machine-readable mediums that will be apparent to those skilled in the relevant art(s) without departing from the spirit and scope of the invention, or any combination thereof. The other machine-readable medium may include, but is not limited to, read only memory (ROM), random access memory (RAM), magnetic disk storage media, optical storage media, flash memory devices, electrical, optical, acoustical or other forms of propagated signals such as carrier waves, infrared signals, digital signals to provide some examples.

The first NFC device 102 and/or the second NFC device 104 may be implemented as a standalone or a discrete device or may be incorporated within or coupled to larger electrical devices or host devices such as mobile telephones, portable computing devices, other computing devices such as personal, laptop, or desktop computers, computer peripherals such as printers, portable audio and/or video players, a payment system, ticketing writing systems such as parking ticketing systems, bus ticketing systems, train ticketing systems or entrance ticketing systems to provide some examples, or in ticket reading systems, toys, games, posters, packaging, advertising materials, product inventory checking systems and/or any other suitable electronic device that will be apparent to those skilled in the relevant art(s) without departing from the spirit and scope of the invention.

The first NFC device 102 and/or the second NFC device 104 interact with each other to exchange information such as data and/or one or more commands to be executed by the first NFC device 102 and/or the second NFC device 104 to provide some examples. The first NFC device 102 operates in an initiator, or a reader, mode of operation and the second NFC device 102 operates as in a target, or a tag, mode of operation. However, this example is not limiting, those skilled in the relevant art(s) will recognize that the first NFC device 102 may be configured to operate in the tag mode and the second NFC device 104 may be configured to operate as in the reader mode in accordance with the teachings herein without departing from the spirit and scope of the present invention. The first NFC device 102 modulates the first information onto the first carrier wave and generates the first magnetic field by applying the modulated data communications to the first antenna to provide the first data communications 152. The first NFC device 102 maintains the first carrier wave without the first information to continue to provide the first data communications 152 once the first information has been transferred to the second NFC device 104. The first NFC device 102 is sufficiently proximate to the second NFC device 104 such that the first data communications 152 is inductively coupled onto a second antenna of the second NFC device 104.

The second NFC device 104 derives or harvests power from the first data communications 152 to recover, to process, and/or to provide a response to the first information. The second NFC device 104 demodulates the first data communications 152 to recover the first information. The second NFC device 104 processes the first information. The second NFC device 104 may respond to the first information by modulating the second information onto the first magnetic field by applying this modulated data communications to the second antenna to provide a second data communications 154.

Further operations of the first NFC device 102 and/or the second NFC device 104 may be described in International Standard ISO/IE 18092:2004(E), "Information Technology—Telecommunications and Information Exchange Between Systems—Near Field Communication—Interface and Protocol (NFCIP-1)," published on Apr. 1, 2004 and International Standard ISO/IE 21481:2005(E), "Information Technology—Telecommunications and Information Exchange Between Systems—Near Field Communication—Interface and Protocol-2 (NFCIP-2)," published on Jan. 15, 2005, each of which is incorporated by reference herein in its entirety.

Figure 2:
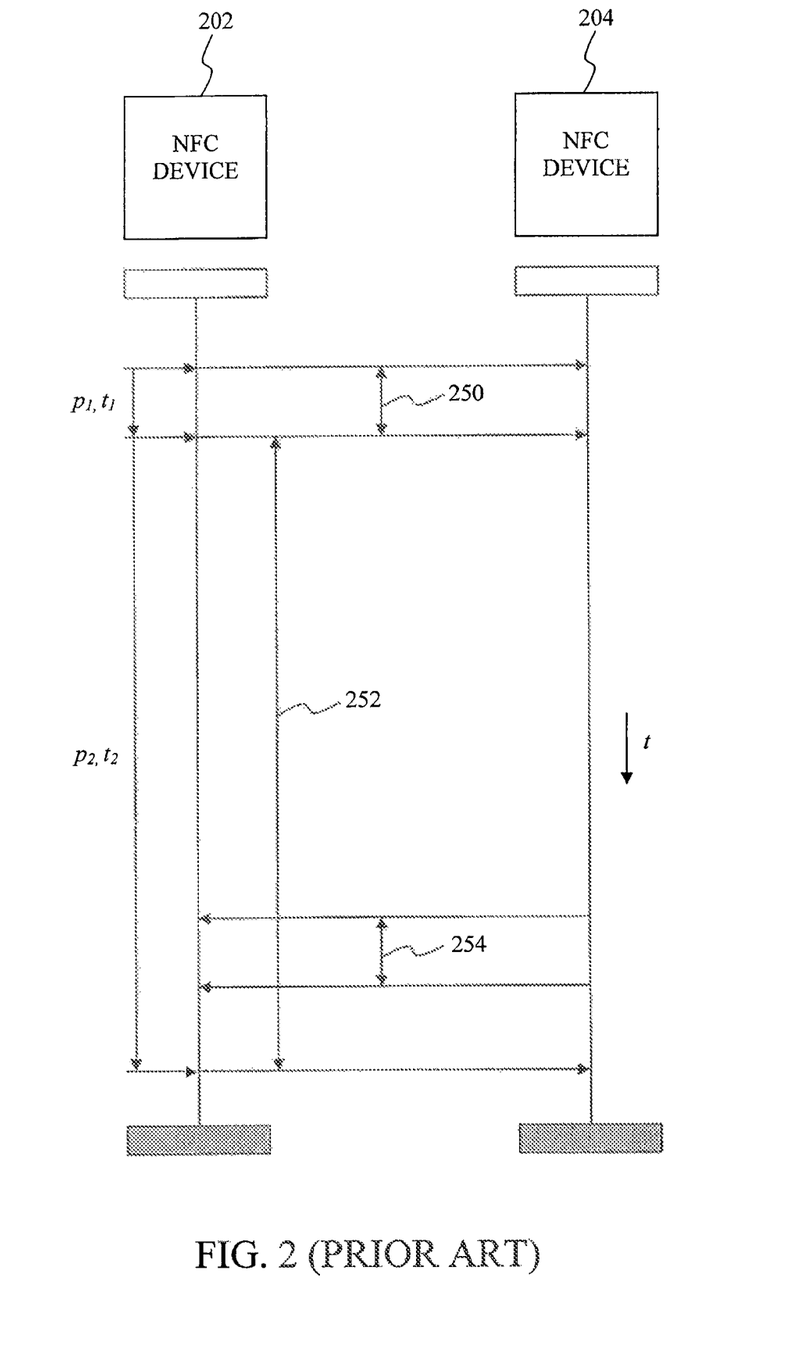
FIG. 2 illustrates a conventional communication between conventional NFC devices within a conventional NFC environment.

Conventional Communication Between Conventional NFC Devices within a Conventional NFC Environment FIG. 2 illustrates a conventional communication between conventional NFC devices within a conventional NFC environment. A first conventional NFC device 202 and a second conventional NFC device 204 interact with each other to exchange information, such as data and/or one or more commands to be executed by the first conventional NFC device 202 and/or the second conventional NFC device 204 to provide some examples. Conventionally, the first conventional NFC device 202 modulates the information onto its corresponding carrier wave and generates a magnetic field by applying the modulated carrier wave to its first antenna for a static duration of $t_1$ and/or a static power $p_1$ to provide a modulated data communication 250. Afterwards, the first conventional NFC device 202 maintains its carrier wave without the information for a static duration of $t_2$ and/or at a static power $p_2$ to the first antenna to generate the magnetic field to provide an unmodulated data communication 252.

The second conventional NFC device 202 derives or harvests power from the modulated data communication 250 and/or the unmodulated data communication 252 to recover, to process, and to provide a response to the information. The second conventional NFC device 202 modulates the magnetic field that is inductively coupled onto its second antenna with the response to the information to provide a second modulated data communication 254.

As shown in FIG. 2, the first conventional NFC device 202 continues to provide the unmodulated data communication 252 even after the second conventional NFC device 204 has provided the second modulated data communication 254. In this situation, the static duration $t_1$ and/or the static duration $t_2$ may be characterized as being unnecessary long. Additionally, although not illustrated in FIG. 2, the static duration $t_1$ and/or the static duration $t_2$ may also be characterized as being unnecessary short. In this situation, the second conventional NFC device 204 is unable to recover, to process, and to provide the response to the information before the first conventional NFC device 202 ceases to provide the unmodulated data communication 252. Further, the static power $p_1$ and/or the static power $p_2$ may be more and/or less power than is required by the second conventional NFC device 204.

Typically, the static duration $t_1$, the static duration $t_1$, the static power $p_1$ and/or the static power $P_2$ are predetermined by a communications standard, such as the International Standard ISO/IE 18092:2004(E) and the International Standard ISO/IE 21481:2005(E). Consequently, the first conventional NFC device 202 and the second conventional NFC device 204 cannot adjust these parameters when more power and/or a longer duration needed to perform other more advanced processing, such as encryption to provide an example. The present invention negotiates one or more communication parameters to optimize the exchange of information between NFC capable devices, such as between the first NFC device 102 and the second NFC device 104 to provide an example. Specifically the present invention optimizes communications parameters to be used to provide a modulated data communication and/or an unmodulated data communication. As a result of this optimization, an initiating NFC device, such as the first NFC device 102 to provide an example, provides the modulated data communication and/or the unmodulated data communication at an optimal power and/or for an optimal duration. The optimal power and/or the optimal duration allows a target device, such as the second NFC device 104 to provide an example, to recover, to process, and to provide a response to information, such as data and/or one or more commands, transferred by the initiating NFC device. The dynamic negotiation of the one or more communication parameters allows the second NFC device 104 more flexibility to perform other more advanced processing.

Exemplary embodiments that follow disclose various communications in a NFC communications environment that allow a first NFC device to communicate with a second NFC device using a first set of parameters, such as, but not limited to, a first data rate or a first power. The second NFC device may communicate to the first NFC device that the first set of parameters are sufficient or are insufficient and require modification. The first NFC device may continue to communicate with the second NFC device using the first set of parameters or a second set of parameters, such as, but not limited to, a second data rate or a second power. For example, the first NFC device may transmit a request for an encrypted transaction at a low power. In this example, the second NFC device determines that it cannot complete the encrypted transaction without more power and so requests the first NFC device to increase the power to a higher power. Alternatively, the second NFC device determines that it can complete the encrypted transaction with the low power and, therefore, no request is made to the first NFC device to increase the power. As another alternate, the second NFC device determines that it can complete the encrypted transaction with less power and so requests the first NFC device to decrease the power to a lower power.

As another example, the first NFC device may transmit a request for an encrypted transaction at a low data rate. In this example, the second NFC device determines that it cannot complete the encrypted transaction without increasing the data rate and so requests the first NFC device to increase the data rate to a higher data rate. Alternatively, the second NFC device determines that it can complete the encrypted transaction with the low data rate and, therefore, no request is made to increase the data rate. As another alternate, the second NFC device determines that it can complete the encrypted transaction with a lesser data rate and so requests the first NFC device to decrease the data rate to a lower data rate.

First Communication Between NFC Devices within the NFC Environment

Figure 3:
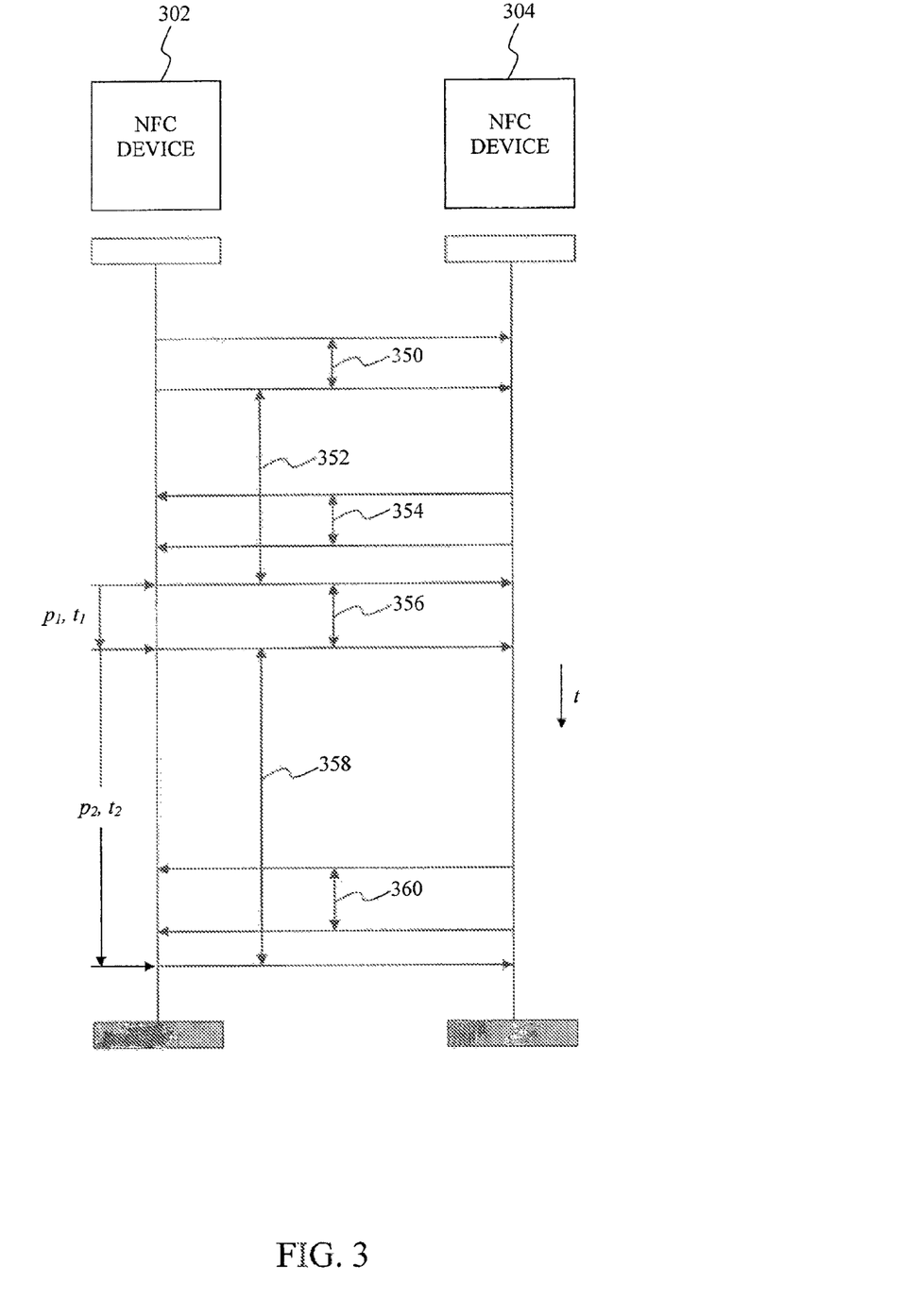
FIG. 3 illustrates a first communication between NFC devices within the NFC environment according to an exemplary embodiment of the present invention.

FIG. 3 illustrates a first communication between NFC devices within the NFC environment according to an exemplary embodiment of the present invention. A first NFC device 302 operates in the initiator, or the reader, mode of operation to initiate a communication with a second NFC device 304 that is operating in the target, or the tag, mode of operation. The first NFC device 302 and the second NFC device 304 interact with each other to negotiate one or more communication parameters to intelligently optimize an exchange of information, such as data and/or one or more commands to provide some examples. The first NFC device 302 and the second NFC device 304 dynamically negotiate the one or more communication parameters before the exchange of the information during an initialization phase, also referred to as a negotiation phase. The first NFC device 302 and the second NFC device 304 may represent exemplary embodiments of the first NFC device 102 and the second NFC device 104, respectively.

The first NFC device 302 determines one or more communication parameters that are to be used to transfer the information to the second NFC device 304. The one or more communications parameters may include one or more communication duration parameters and/or one or more communication power parameters. The one or more communication duration parameters may represent one or more parameters that relate to a dynamic duration $t_1$ of a modulated data communication 356 and/or a dynamic duration $t_2$ of an unmodulated data communication 358. Although the dynamic duration $t_1$ is illustrated as being less than the dynamic duration $t_2$, those skilled in the relevant art(s) will recognize that the dynamic duration $t_1$ may be greater than or equal to the dynamic duration $t_2$ without departing from the spirit and scope of the present invention. The one or more communication duration parameters may include one or more parameters that are used by the first NFC device 302 to provide the modulated data communication 356 and/or the unmodulated data communication 358 which may include a transmission data rate, a modulation scheme, a frame size, and/or any other suitable parameter that may affect the dynamic duration $t_1$ of the modulated data communication 356 and/or the dynamic duration $t_2$ of the unmodulated data communication 358 that will be apparent to those skilled in the relevant art(s) without departing from the spirit and scope of the invention.

The one or more communication power parameters may represent one or more parameters that relate to a dynamic power $p_1$ of a modulated data communication 356 and/or a dynamic power $p_2$ of an unmodulated data communication 358. The dynamic power $p_1$ may be greater than, less than, or equal to the dynamic power $p_2$. The one or more communication power parameters may include one or more parameters that are used by the first NFC device 302 to provide the modulated data communication 356 and/or the unmodulated data communication 358 which may include a transmission power level, an antenna configuration, a modulation scheme, and/or any other suitable parameter that may affect the dynamic power $p_1$ of the modulated data communication 356 and/or the dynamic power $p_2$ of the unmodulated data communication 358 that will be apparent to those skilled in the relevant art(s) without departing from the spirit and scope of the invention.

The first NFC device 302 modulates a data communication including the one or more communication parameters onto its corresponding carrier wave and generates a magnetic field by applying the modulated carrier wave to a first antenna to provide a modulated initialization communication 350. After transferring the data communication to the second NFC device 304, the first NFC device 302 maintains its carrier wave to the first antenna to provide an unmodulated initialization communication 352. Typically, the first NFC device 302 provides the initialization unmodulated data communication 352 until a response is received from the second NFC device 304.

The second NFC device 304 derives or harvests power from the modulated initialization communication 350 and/or the unmodulated initialization communication 352 to process the one or more communication parameters. The second NFC device 304 processes the modulated initialization communication 350 to estimate whether the one or more communication parameters are sufficient to recover, to process, and/or to provide the response to the information. The one or more communication parameters may be characterized as being sufficient when these communications parameters, when used by the first NFC device 302, cause the modulated data communication 356 to have a sufficient dynamic duration $t_1$ and/or a sufficient dynamic power $p_1$ and/or the unmodulated data communication 358 to have a sufficient dynamic duration $t_2$ and/or a sufficient dynamic power $p_2$ for the second NFC device 304 to recover, to process, and/or to provide the response to the information. In contrast, the one or more communication parameters may be characterized as being insufficient when one or more of these communications parameters, when used by the first NFC device 302, prevent the modulated data communication 356 from having the sufficient dynamic duration $t_1$ and/or the sufficient dynamic power $p_1$ and/or the unmodulated data communication 358 from having the sufficient dynamic duration $t_2$ and/or the sufficient dynamic power $p_2$. In this situation, the second NFC device 304 cannot recover, cannot process, and/or cannot provide the response.

The second NFC device 304 responds to the modulated initialization communication 350 by modulating the magnetic field generated by the first NFC device 302 with the response to provide a response communication 354. The response communication 354 may indicate the one or more communication parameters are sufficient and may be used by the first NFC device 302 to provide the modulated data communication 356 and/or the unmodulated data communication 358. The response communication 354 may identify one or more of the communication parameters as being insufficient and/or may provide adjustments to these insufficient communication parameters to make them sufficient.

Although not illustrated in FIG. 3, the first NFC device 302 and the second NFC device 304 continue to negotiate the one or more communication parameters until the one or more communication parameters are sufficient. Specifically, the first NFC device 302 may continue to provide the modulated initialization communication 350 to the second NFC device 304 and the second NFC device 304 may continue to provide the response communication 354 until the one or more communication parameters cause the first NFC device 302 to provide the modulated data communication 356 at the sufficient dynamic power $p_1$ and/or for the sufficient dynamic duration $t_1$ and/or the unmodulated data communication 358 at the sufficient dynamic power $p_2$ and/or for the sufficient dynamic duration $t_2$.

The first NFC device 302 adjusts the one or more communication parameters that have been identified by the response communication 354 as being insufficient. For example, the first NFC device 302 may adjust the transmission data rate that is to be used to transfer the information to adjust the dynamic duration $t_1$ of the modulated data communication 356. As another example, the first NFC device 302 may adjust the frame size that is to be used to transfer the information to adjust the dynamic duration $t_1$ of the modulated data communication 356. As a further example, the first NFC device 302 may adjust the transmission power level of the modulated data communication 358 and/or the unmodulated data communication 358 to adjust the dynamic power $p_1$ and/or the dynamic power $p_2$.

The first NFC device 302 uses the one or more communication parameters to provide the modulated data communication 356 for the dynamic duration $t_1$ and/or at the dynamic power $p_1$. The first NFC device 302 continues use the one or more communication parameters to provide the unmodulated data communication 358 for the dynamic duration $t_2$ and/or at the dynamic power $p_2$. The one or more communications parameters used to provide the modulated data communication 356 may be similar to or dissimilar to the one or more communications parameters used to provide the unmodulated data communication 358.

The second NFC device 304 derives or harvests power from the modulated data communication 356 and/or the unmodulated data communication 358 to recover, to process, and/or to provide the response to the information. The second NFC device 304 may respond to the information by modulating the magnetic field that is coupled to its second antenna with information to be communicated to the first NFC device 302 to provide a response communication 360. Typically, the first NFC device 302 ceases to provide the unmodulated data communication 358 approximately when the first NFC device 302 has completed processing the response communication 360.

Second Communication Between NFC Devices within the NFC Environment

Typically, the one or more communication parameters are negotiated between the first NFC device 302 and the second NFC device 304 to intelligently optimize the exchange of the information between these devices. However, changes in the NFC environment 100, as well as changes in the first NFC device 302 and/or the second NFC device 304 themselves, during the exchange of the information may cause the dynamic duration $t_1$, the dynamic duration $t_2$, the dynamic power $p_1$ and/or the dynamic power $p_2$ to longer be sufficient. In this situation, the second NFC device 304 may request the first NFC device 302 to adjust the one or more communication parameters. For example, a distance between the first NFC device 302 and the second NFC device 304 may change thereby causing a different dynamic duration $t_1$ and/or a different dynamic power $p_1$ for the modulated data communication 356. As another example, the distance between the first NFC device 302 and the second NFC device 304 may change thereby causing a different dynamic duration $t_2$ and/or a different dynamic power $p_2$ for the unmodulated data communication 358.

Figure 4:
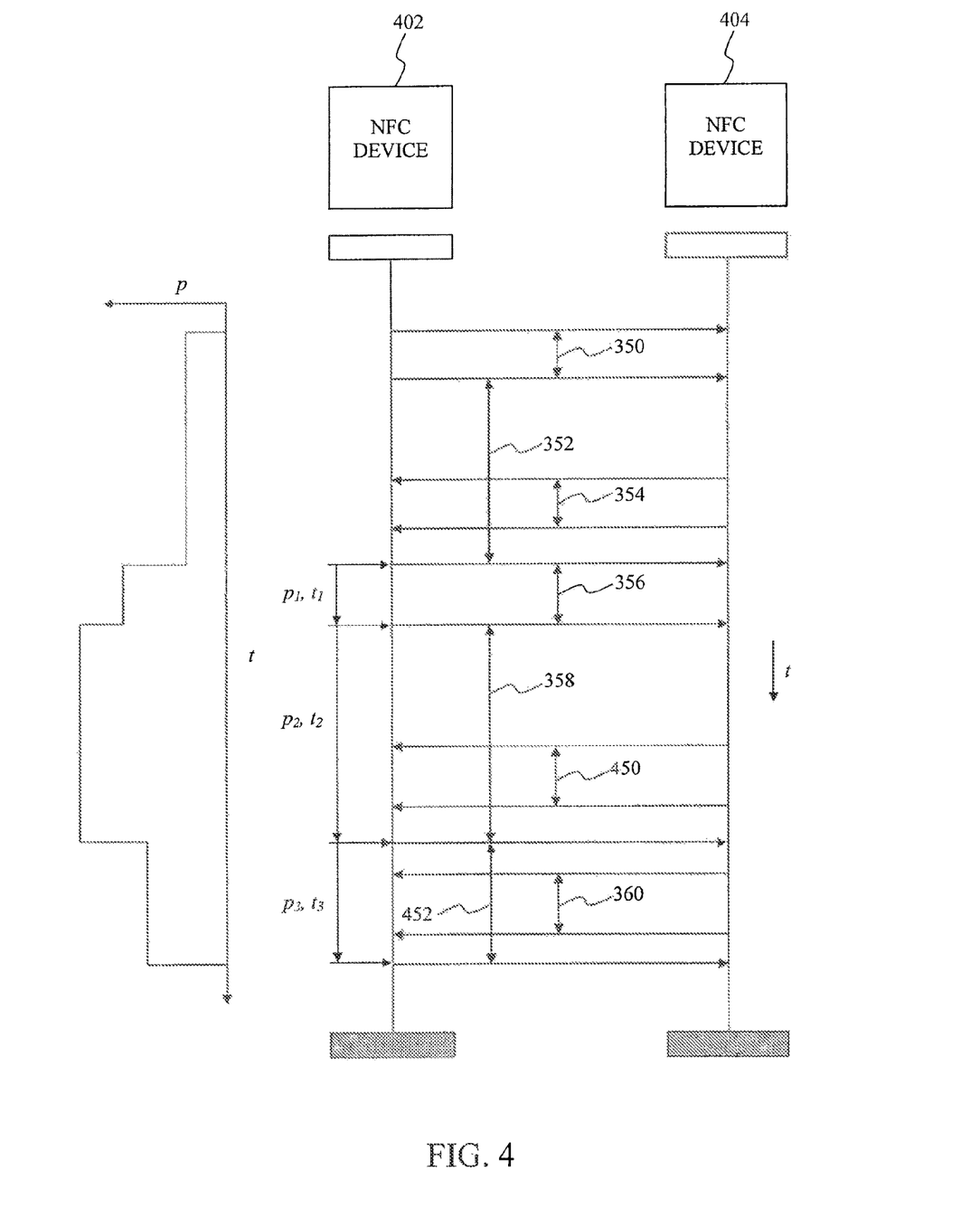
FIG. 4 illustrates a second communication between NFC devices within the NFC environment according to an exemplary embodiment of the present invention.

FIG. 4 illustrates a second communication between NFC devices within the NFC environment according to an exemplary embodiment of the present invention. A first NFC device 402 operates in the initiator, or the reader, mode of operation to initiate a communication with a second NFC device 404 that is operating in the target, or the tag, mode of operation. The first NFC device 402 and the second NFC device 404 interact with each other to negotiate one or more communication parameters to intelligently optimize an exchange of information, such as data and/or one or more commands to provide some examples, during the initialization phase as discussed in FIG. 3. However, as illustrated in FIG. 4, the second NFC device 404 may request the first NFC device 402 to adjust the one or more communication parameters during the exchange of the information. The first NFC device 402 and the second NFC device 404 may represent exemplary embodiments of the first NFC device 102 and the second NFC device 104, respectively. The second communication as illustrated in FIG. 4 shares many substantially similar features as the first communication as illustrated in FIG. 3; therefore only differences between the first communication and the second communication are to be discussed in further detail. For clarity of explanation, FIG. 4 also includes a representation of an example of the changing power level of transmission from the first NFC device 402 for the various phases of communication between the first NFC device 402 and the second NFC device 404. However, this example is not limiting, those skilled in the relevant art(s) will recognize that different power levels are possible for the various phases without departing from the spirit and scope of the present invention.

The first NFC device 402 and the second NFC device 404 negotiate the one or more communication parameters as discussed above.

The first NFC device 402 uses the one or more communication parameters to modulate the information onto its corresponding carrier wave and to generate the magnetic field by applying the modulated carrier wave to the first antenna to provide the modulated data communication 356 for the dynamic duration $t_1$ and/or at the dynamic power $p_1$. The first NFC device 402 continues to use the one or more communication parameters to apply its carrier wave, without the information, to the first antenna to generate the magnetic field to provide the unmodulated data communication 358 for the dynamic duration $t_2$ and/or at the dynamic power $p_2$.

The second NFC device 404 monitors the dynamic duration $t_2$ and/or at the dynamic power $p_2$ to ensure that the dynamic duration $t_2$ and/or at the dynamic power $p_2$ are of sufficient duration and/or sufficient power to allow the second NFC device 404 to recover, to process, and/or to provide the response to the information. For example, the second NFC device 404 may determine whether the unmodulated data communication 358 is of sufficient duration to recover, to process, and/or to provide the response to the information. However, if the second NFC device 404 determines that the dynamic duration $t_2$ and/or at the dynamic power $p_2$ are not of sufficient duration and/or sufficient power, the second NFC device 404 modulates the magnetic field with a request to provide a request communication 450. The request communication 450 may identify one or more of the communication parameters that are not sufficient and/or may provide adjustments to these insufficient communication parameters to make them sufficient. For example, the request communication 450 may request that the one or more parameters be adjusted such that the dynamic duration $t_2$ and/or at the dynamic power $p_2$ of the unmodulated data communication 358 may be adjusted to a dynamic duration $t_3$ and/or a dynamic power $p_3$, respectively. Although not illustrated in FIG. 4, more than one request communication 450 may be provided by the second NFC device 404 to cause the first NFC device 402 to adjust the one or more communication parameters during the exchange of the information between the first NFC device 402 and the second NFC device 404.

The first NFC device 402 adjusts the one or more communication parameters that have been identified by the request communication 450. For example, the first NFC device 402 may adjust the transmission power level of the unmodulated data communication 358 to adjust the dynamic power $p_2$. The first NFC device 402 applies its carrier wave using these one or more adjusted communication parameters to the first antenna to generate the magnetic field to provide an adjusted unmodulated data communication 452 for the dynamic duration $t_3$ and/or at the dynamic power $p_3$.

The second NFC device 404 recovers the information, processes the information, and/or provides the response to provide the response communication 360 as discussed above.

Third Communication Between NFC Devices within the NFC Environment

As discussed in FIG. 3 and FIG. 4, the first NFC device 302 and/or the first NFC device 402 determines one or more communication parameters that are to be used to transfer the information without regard to the time and/or the power requirements of the second NFC device 304 and/or the second NFC device 404, respectively.

Figure 5:
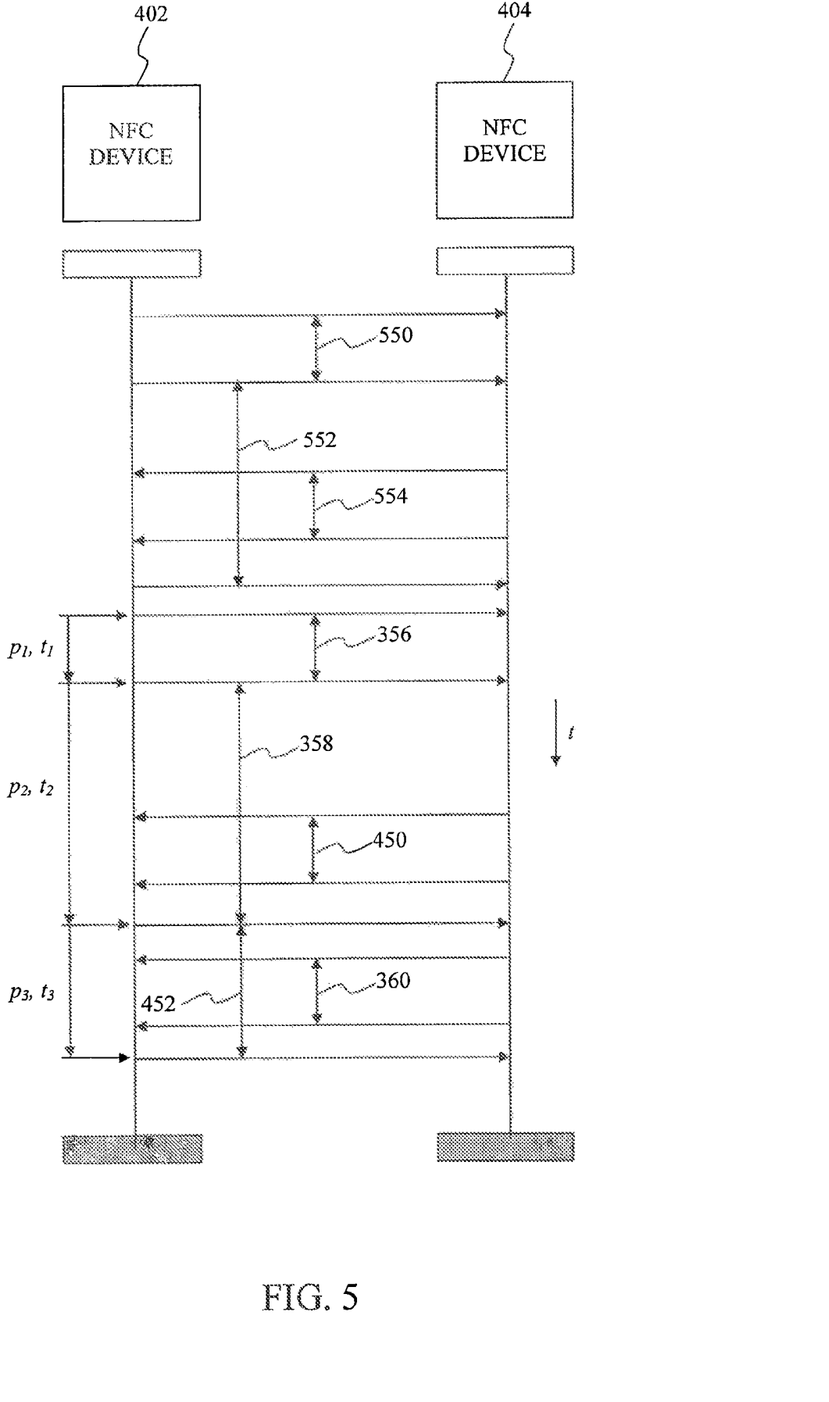
FIG. 5 illustrates a third communication between NFC devices within the NFC environment according to an exemplary embodiment of the present invention.

Alternatively, FIG. 5 illustrates a third communication between NFC devices within the NFC environment according to an exemplary embodiment of the present invention. A first NFC device 502 operates in the initiator, or the reader, mode of operation to initiate a communication with a second NFC device 504 that is operating in the target, or the tag, mode of operation. The first NFC device 502 characterizes the information that is to be transferred to a second NFC device 504. In this situation, the second NFC device 504 estimates time and/or power required to recover, to process, and/or to provide the response to the information using this characterization. The first NFC device 502 determines the one or more communication parameters using this estimate. As a result, the negotiation process between the first NFC device 502 and the second NFC device 504 may be reduced. The first NFC device 502 and the second NFC device 504 may represent exemplary embodiments of the first NFC device 102 and the second NFC device 104. The third communication as illustrated in FIG. 5 shares many substantially similar features as the second communication as illustrated in FIG. 4; therefore only differences between the second communication and the third communication are to be discussed in further detail.

The first NFC device 502 receives information, such as data and/or one or more commands to provide some examples, that is to be transferred to the second NFC device 504. The first NFC device 502 characterizes the information that is to be transferred to the second NFC device 504 to provide one or more information parameters. Typically, the one or more information parameters may represent one or more parameters that may be used by the second NFC device 504 to estimate time and/or power required to recover, to process, and/or to provide the response to the information. For example, the one or more information may include a length of the data, one or more indicators relating to the one or more commands, one or more indicators relating to a family of commands to which the one or more commands belong and/or any other suitable characterization of the information that will allow the second NFC device 504 to estimate the time and/or the power required to recover, to process, and/or to provide the response to the information that will be apparent to those skilled in the relevant art(s) without departing from the spirit and scope of the present invention.

The first NFC device 502 modulates a data communication including the one or more information parameters onto its corresponding carrier wave and generates a magnetic field by applying the modulated carrier wave to a first antenna to provide a modulated initialization communication 550. After transferring the information to the second NFC device 504, the first NFC device 502 maintains its carrier wave without the information to the first antenna to provide an unmodulated initialization communication 552. Typically, the first NFC device 502 provides the initialization unmodulated initialization communication 552 until a response is received from the second NFC device 504.

The second NFC device 504 estimates the time and/or the power required to recover, to process, and/or to provide the response to the information based upon the one or more information parameters. The second NFC device 504 derives or harvests power from the modulated initialization communication 550 and/or the unmodulated initialization communication 552. The second NFC device 504 estimates the time and/or the power required to recover, to process, and/or to provide the response to the information based upon the one or more information parameters. The second NFC device 504 responds to the modulated initialization communication 550 by modulating the magnetic field with a response to provide a response communication 554. The response communication 554 may indicate the time and/or the power required to recover, to process, and/or to provide the response to the information as estimated by the second NFC device 504.

The first NFC device 502 determines one or more communications parameters that are to be used to transfer the information to the second NFC device 504 to satisfy the time and/or the power requirements of the second NFC device 504. The one or more communications parameters may include the one or more communication duration parameters and/or the one or more communication power parameters as discussed in FIG. 3. For example, the first NFC device 502 may determine one or more communication parameters that provide the modulated data communication 356 for the dynamic duration $t_1$ and/or at the dynamic power $p_1$ and/or the unmodulated data communication 358 for the dynamic duration $t_2$ and/or the dynamic power $p_2$ to satisfy the time and/or the power requirements of the second NFC device 504.

The first NFC device 502 and the second NFC device 504 continue to proceed with the exchange of the information as discussed in FIG. 3 and FIG. 4.

Fourth Communication Between NFC Devices within the NFC Environment

Instead of negotiating the one or more communication parameters before exchanging information between NFC capable devices as discussed in FIG. 3 through FIG. 5, the NFC capable devices may negotiate the one or more communications parameters contemporaneously with the exchange of the information.

Figure 6:
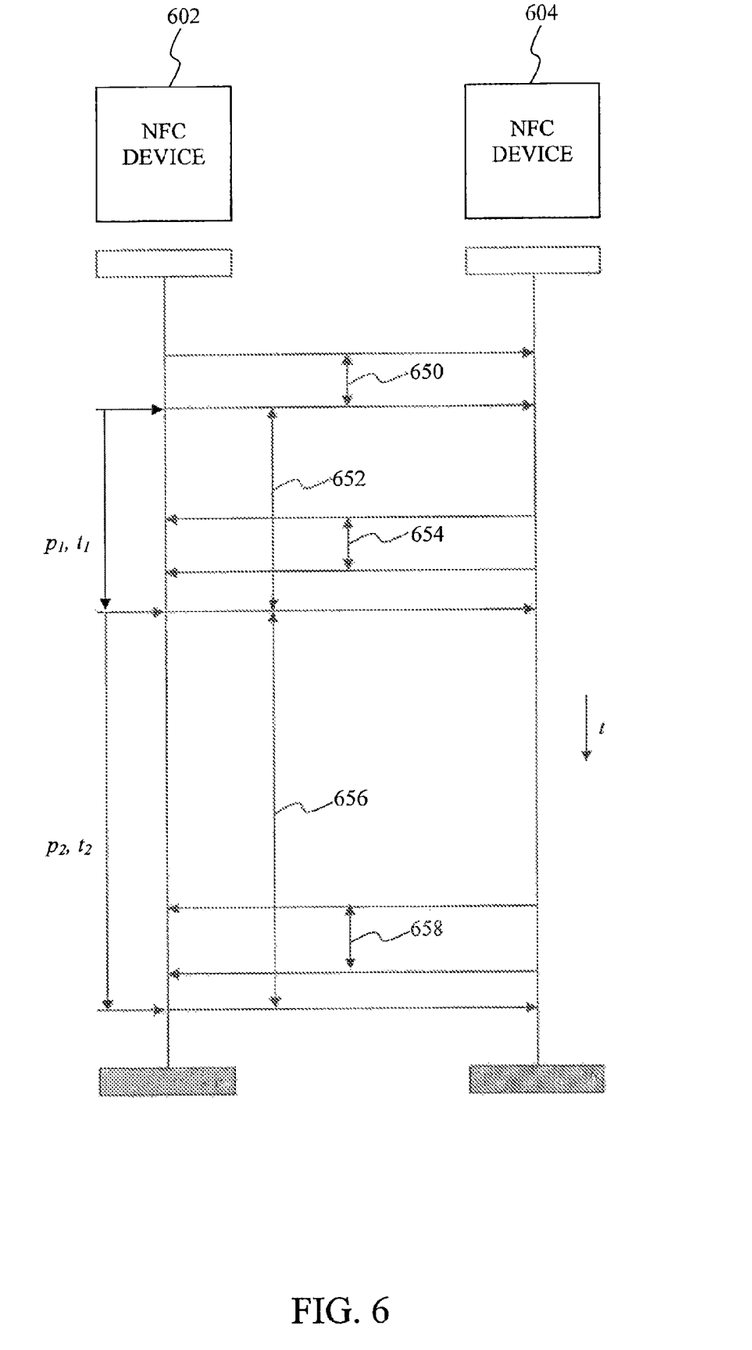
FIG. 6 illustrates a fourth communication between NFC devices within the NFC environment according to an exemplary embodiment of the present invention.

FIG. 6 illustrates a fourth communication between NFC devices within the NFC environment according to an exemplary embodiment of the present invention. A first NFC device 602 operates in the initiator, or the reader, mode of operation to initiate a communication with a second NFC device 604 that is operating in the target, or the tag, mode of operation. The first NFC device 602 provides the information to the second NFC device 604 using one or more predetermined communication parameters. The second NFC device 604 may request the first NFC device 602 to adjust the one or more communication parameters during the exchange of the information if these one or more predetermined communication parameters are insufficient. The first NFC device 602 and the second NFC device 604 may represent exemplary embodiments of the first NFC device 102 and the second NFC device 104, respectively.

The first NFC device 602 modulates the information using one or more predetermined communication parameters and generates a magnetic field by applying the modulated carrier wave to a first antenna to provide a modulated data communication 650. The one or more predetermined communication parameters represent one more parameters which are predetermined by a communications standard, such as the International Standard ISO/IE 18092:2004(E) and/or the International Standard ISO/IE 21481:2005(E). Alternatively, the one or more predetermined communication parameters may represent communication parameters that were used in prior communications between the first NFC device 602 and the second NFC device 604. In another alternate, the one or more predetermined communication parameters may represent communications parameters that have been used previously by the first NFC device 602 to transfer similar information to another NFC capable device. The first NFC device 602 may encapsulate the one or more predetermined communication parameters into a header portion and the information into a data portion of one or more data frames. After transferring the information and, optionally, the one or more predetermined communication parameters to the second NFC device 604, the first NFC device 602 maintains its carrier wave without the information and the one or more communication parameters to the first antenna to provide an unmodulated data communication 652 for the dynamic duration $t_1$ and/or at the dynamic power $p_1$.

The second NFC device 604 derives or harvests power from the modulated data communication 650 and/or the unmodulated data communication 652 to process the one or more communication parameters to estimate whether the one or more predetermined communication parameters are sufficient. The second NFC device 604 may de-encapsulate the one or more predetermined communication parameters from the header portion of the one or more data frames. The one or more predetermined communication parameters may be characterized as being sufficient when these communications parameters, when used by the first NFC device 602, cause the unmodulated data communication 652 have a sufficient dynamic duration $t_1$ and/or a sufficient dynamic power $p_1$ to allow the second NFC device 604 to recover, to process, and/or to provide the response to the information. In contrast, the one or more predetermined communication parameters may be characterized as being not be sufficient when one or more of these communications parameters, when used by the first NFC device 602, prevent the unmodulated data communication 652 from having the sufficient dynamic duration $t_1$ and/or the sufficient dynamic power $p_1$ such that the second NFC device 604 cannot recover the information, cannot process the information, and/or cannot provide the response.

The second NFC device may modulate the magnetic field with a request to provide a request communication 654. The request communication 654 may identify one or more of the predetermined communication parameters that are insufficient and/or may provide adjustments to these insufficient communication parameters to make them sufficient. For example, the request communication 654 may request that the one or more predetermined parameters be adjusted such that the dynamic duration $t_1$ and/or the dynamic power $p_1$ of the unmodulated data communication 652 be adjusted to a dynamic duration $t_2$ and/or a dynamic power $p_2$. Although not illustrated in FIG. 4, more than one request communication 654 may be provided by the second NFC device 604 to cause the first NFC device 602 to adjust one or more communication parameters being used by the first NFC device 602.

The first NFC device 602 adjusts the one or more predetermined communication parameters that have been identified by the request communication 654. The first NFC device 602 may adjust the one or more predetermined communication parameters to adjust the dynamic duration $t_1$ and/or dynamic power $p_1$ to provide an unmodulated data communication 652 for a dynamic duration $t_2$ and/or at a dynamic power $p_2$.

The second NFC device 604 derives or harvests power from the modulated data communication 650, the unmodulated data communication 652, and/or the unmodulated data communication 656 to recover, to process, and/or to provide the response to the information. The second NFC device 604 may respond to the information by modulating the magnetic field that is coupled to its second antenna with information to be communicated to the first NFC device 602 to provide a response communication 658. Typically, the first NFC device 604 ceases to provide the unmodulated data communication 652 and/or the unmodulated data communication 656 approximately when the first NFC device 602 has completed processing the response communication 658.

An Exemplary Embodiment of the First NFC Device

Figure 7:
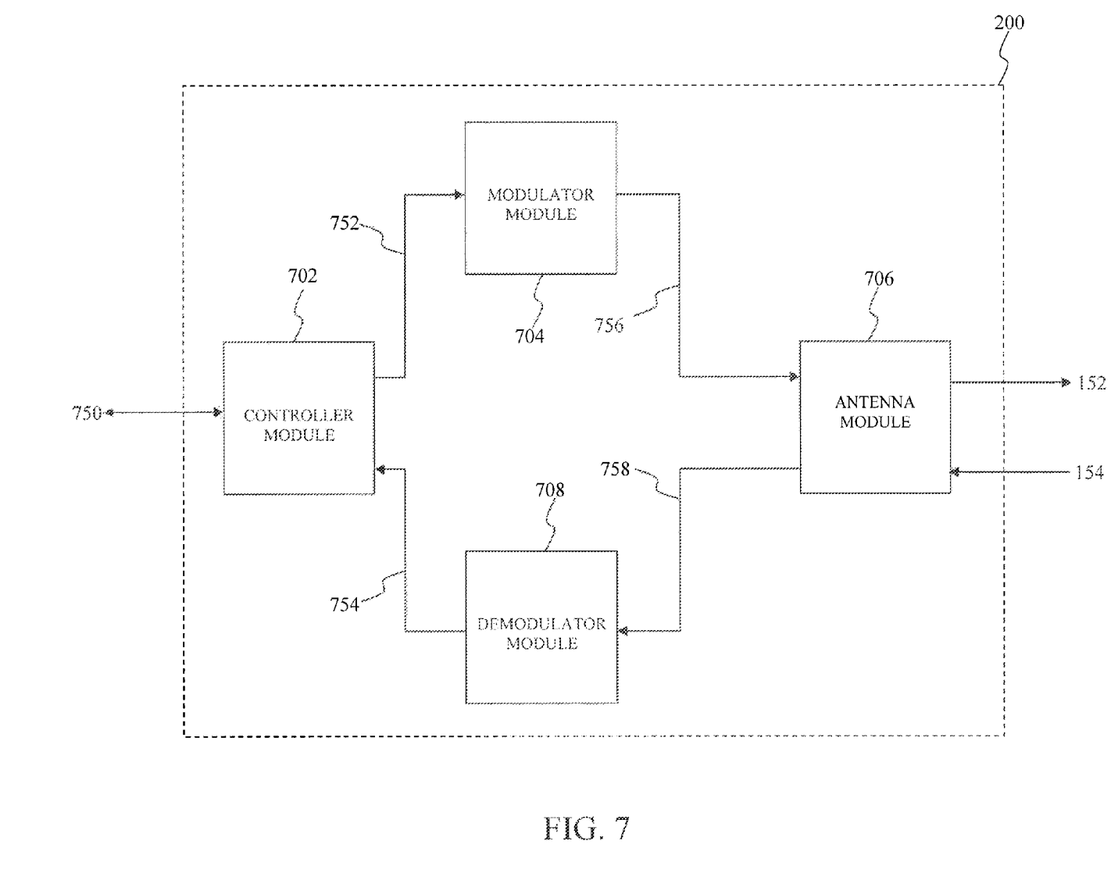
FIG. 7 illustrates a first communication device within the NFC environment according to an exemplary embodiment of the present invention.

FIG. 7 illustrates a first communication device within the NFC environment according to an exemplary embodiment of the present invention. A NFC device 700 interacts with another NFC device to exchange information such as data and/or one or more commands to be executed by the NFC device 700 and/or the other device to provide some examples. The NFC device 700 operates in an initiator, or a reader, mode of operation and can represent an exemplary embodiment of the first NFC device 102. The NFC device 700 includes a controller module 702, a modulator module 704, an antenna module 706, and a demodulator module 708.

The controller module 702 controls overall operation and/or configuration of the NFC device 700. The controller module 702 provides information 250 to and/or receives the information 750 from one or more data storage devices such as one or more contactless transponders, one or more contactless tags, one or more contactless smartcards, any other machine-readable mediums that will be apparent to those skilled in the relevant art(s) without departing from the spirit and scope of the disclosure, or any combination thereof. The other machine-readable medium may include, but is not limited to, read only memory (ROM), random access memory (RAM), magnetic disk storage media, optical storage media, flash memory devices, electrical, optical, acoustical or other forms of propagated signals such as carrier waves, infrared signals, digital signals to provide some examples. The controller module 702 may also provide the information 750 to and/or receive the information 750 from other electrical devices or host devices coupled to the NFC device 700.

The controller module 702 can provide the information 750 as transmission information 752 for transmission to another NFC capable device. Additionally, the controller module 702 can provide recovered information 754 from the demodulator module 708 as the information 750. Further, the controller module 702 may also use the information 750 and/or the recovered information 754 to control the overall operation and/or configuration of the NFC device 700. For example, the controller module 702 can configure the modulator module 704, the antenna module 706, and/or the demodulator module 708 to cause the NFC device 700 to communicate as described in FIG. 3, FIG. 4, FIG. 5, or FIG. 6.

The modulator module 704 modulates the transmission information 752 onto a carrier wave to provide a modulated information signal as a transmission signal 756. The modulator module 704 maintains the first carrier wave without the transmission information 752 to continue to an unmodulated information signal as a transmission signal 756 once the first information has been transferred to other NFC capable device.

The antenna module 706 applies the transmission signal 756 to its inductive coupling element to generate a magnetic field to provide the first data communications 152. Similarly, the antenna module 706 inductively receives the second data communications 154 from the other NFC capable device to provide a recovered signal 758.

The demodulator module 708 demodulates the recovered signal 758 to provide the recovered information 754.

An Exemplary Embodiment of the Second NFC Device

Figure 8:
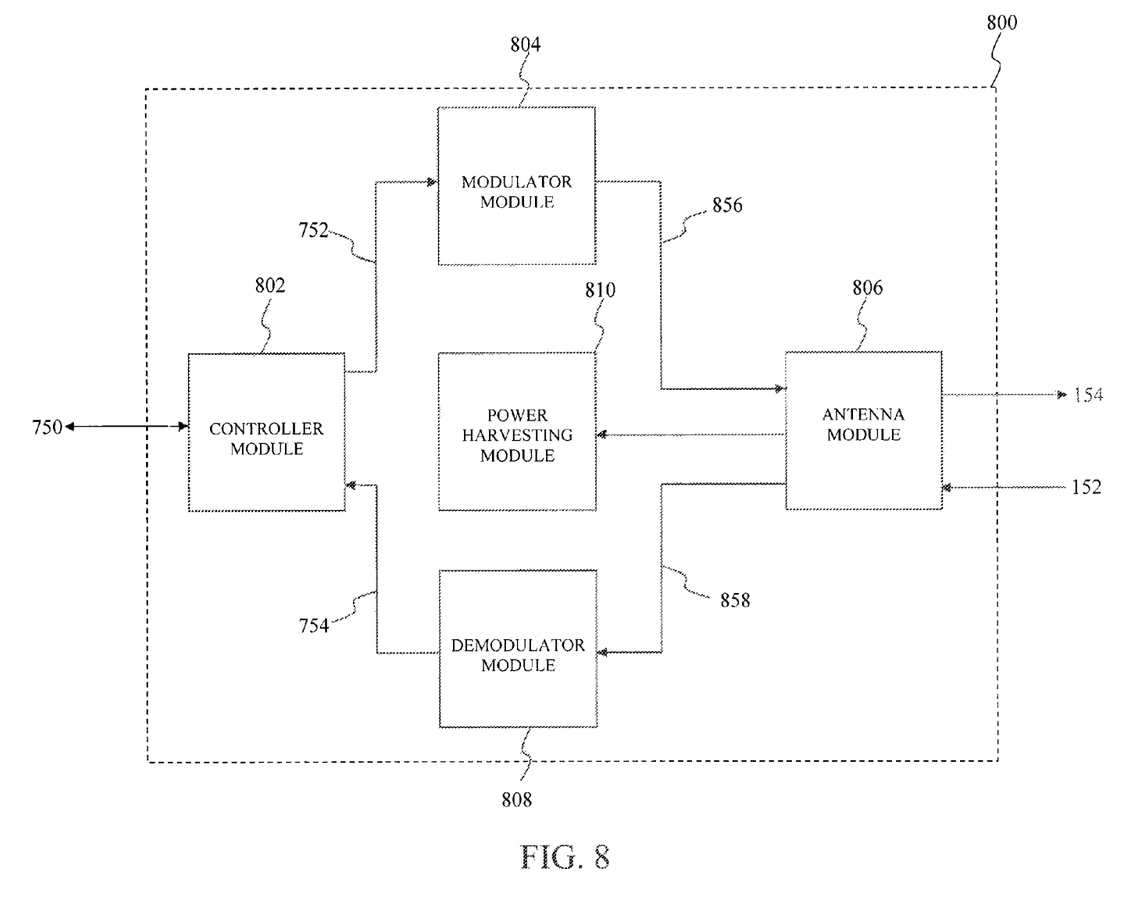
FIG. 8 illustrates a second communication device within the NFC environment according to an exemplary embodiment of the present invention.

FIG. 8 illustrates a second communication device within the NFC environment according to an exemplary embodiment of the present invention. A NFC device 800 interacts with another NFC device to exchange information such as data and/or one or more commands to be executed by the NFC device 800 and/or the other device to provide some examples. The NFC device 800 operates in operates as in a target, or a tag, mode of operation and can represent an exemplary embodiment of the second NFC device 104. The NFC device 800 includes a controller module 802, a modulator module 804, an antenna module 806, a demodulator module 808, and a power harvesting module 810.

The controller module 802 operates in a substantially similar manner as the controller module 702; however, the controller module 802 can configure the modulator module 804, the antenna module 806, and/or the demodulator module 808 to cause the NFC device 800 to communicate as described in FIG. 3, FIG. 4, FIG. 5, or FIG. 6.

The modulator module 804 modulates the transmission information 752 to provide a modulated information signal as a transmission signal 856.

The antenna module 806 applies the transmission signal 856 to its inductive coupling element to modulate a magnetic field that is provided by another NFC capable device to provide the second data communications 154. Similarly, the antenna module 806 inductively receives the first data communications 152 from the other NFC capable device to provide a recovered signal 858.

The demodulator module 808 demodulates the recovered signal 858 to provide the recovered information 754.

The power harvesting module 810 derives or harvests power from the first data communications 152.

CONCLUSION

It is to be appreciated that the Detailed Description section, and not the Abstract section, is intended to be used to interpret the claims. The Abstract section may set forth one or more, but not all exemplary embodiments, of the invention, and thus, are not intended to limit the invention and the appended claims in any way.

The invention has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the invention. Thus the invention should not be limited by any of the above-described exemplary embodiments, but should be defined only in accordance with the following claims and their equivalents.

What is claimed is:

1. A method for negotiating a communication parameter between near field communications (NFC) capable communication devices, comprising:
   maintaining, by a first NFC capable communication device, an unmodulated data communication at a first power for a first duration in accordance with the communication parameter;
   receiving, by the first NFC capable communication device, a request communication from a second NFC capable communication device during the first duration indicating that the first communication parameter is insufficient;
   adjusting, by the first NFC capable communication device, the communication parameter in accordance with the request communication during the first duration to provide a second communication parameter; and
   providing, by the first NFC capable communication device, a second unmodulated data communication at a second power during a second duration in accordance with the second communication parameter, the second power being different from the first power.

2. The method of claim 1, further comprising:
   modulating, by the first NFC capable communication device, a first data communication onto a carrier wave to provide a modulated data communication to the second NFC capable communication device, the first data communication including the communication parameter and information that is to be transferred to the second NFC capable communication device.

3. The method of claim 2, wherein the modulating comprises:
   encapsulating the communication parameter into a header portion of a data frame and the information into a data portion of the data frame;
   modulating the data frame with the carrier wave to provide a modulated data frame; and
   generating a magnetic field using the modulated data frame in accordance with the communication parameter to provide the modulated data communication.

4. The method of claim 2, further comprising:
   receiving, by the first NFC capable communication device, a response to the modulated data communication from the second NFC capable communication device.

5. The method of claim 1, wherein the communication parameter relates to a power of the unmodulated data communication.

6. The method of claim 4, wherein the communication parameter comprises:
   a transmission power level;
   an antenna configuration; or
   a modulation scheme.

7. The method of claim 1, wherein the communication parameter comprises:
   a first parameter, which when used by the first NFC capable communication device, affects a duration of the unmodulated data communication;
   a second parameter, which when used by the first NFC capable communication device, affects a duration of a modulated data communication;
   a third parameter, which when used by the first NFC capable communication device, affects a power of the unmodulated data communication; or
   a fourth parameter, which when used by the first NFC capable communication device, affects a power of the modulated data communication.

8. The method of claim 1, wherein the providing comprises:
   maintaining the second unmodulated data communication at the second power during the second duration in accordance with the second communication parameter.

9. The method of claim 1, wherein the second NFC capable communication device cannot recover, process, or provide a response to information when the unmodulated data communication is at the first power during the first duration.

10. A near field communications (NFC) capable apparatus for negotiating a communication parameter between NFC capable communication devices, comprising:
    a modulator module; and
    a controller module configured to:
       cause the modulator module to maintain an unmodulated data communication at a first power during a first duration in accordance with the communication parameter;
       receive a request from a NFC capable communication device during the first duration indicating that the first communication parameter is insufficient,
       adjust the communication parameter in accordance with the request during the first duration to provide a second communication parameter, and
       cause the modulator module to provide a second unmodulated data communication at a second power during a second duration in accordance with the second communication parameter, the second power being different from the first power.

11. The NFC capable apparatus of claim 10, wherein the modulator module is configured to modulate a first data communication onto a carrier wave to provide a modulated data communication to the NFC capable communication device, the first data communication including the communication parameter and information that is to be transferred to the NFC capable communication device.

12. The NFC capable apparatus of claim 11, wherein the modulator module is further configured to:
encapsulate the communication parameter into a header portion of a data frame and the information into a data portion of the data frame, and
modulate the data frame with the carrier wave to provide a modulated data frame, wherein the modulator module further comprises:
an antenna module configured to generate a magnetic field using the modulated data frame in accordance with the communication parameter to provide the modulated data communication.

13. The NFC capable apparatus of claim 11, wherein the controller module is further configured to receive a response to the modulated data communication from the NFC capable communication device.

14. The NFC capable apparatus of claim 10, wherein the communication parameter relates to a power of the unmodulated data communication.

15. The NFC capable apparatus of claim 10, further comprising:
a demodulator configured to demodulate a request communication from the NFC capable communication device to provide the request.

16. The NFC capable apparatus of claim 10, wherein the communication parameter comprises:
a first parameter, which when used by the NFC capable apparatus, affects a duration of the unmodulated data communication;
a second parameter, which when used by the NFC capable apparatus, affects a duration of a modulated data communication;
a third parameter, which when used by the NFC capable apparatus, affects a power of the unmodulated data communication; or
a fourth parameter, which when used by the NFC capable apparatus, affects a power of the modulated data communication.

17. The NFC capable apparatus of claim 10, wherein the modulator module is configured to maintain the second unmodulated data communication at the second power during the second duration in accordance with the second communication parameter.

18. The NFC capable apparatus of claim 10, wherein the NFC capable communication device cannot recover, process, or provide a response to information when the unmodulated data communication is at the first power during the first duration.

* * * * *

UNITED STATES PATENT AND TRADEMARK OFFICE
CERTIFICATE OF CORRECTION

| | | |
|---|---|---|
| PATENT NO. | : 8,831,512 B2 | |
| APPLICATION NO. | : 13/171041 | |
| DATED | : September 9, 2014 | |
| INVENTOR(S) | : Laws et al. | |

It is certified that error appears in the above-identified patent and that said Letters Patent is hereby corrected as shown below:

In the Claims

In column 15, line 42, replace "the first communication" with --the communication--.
In column 16, lines 51-52, replace "the first communication" with --the communication--.

Signed and Sealed this
Seventeenth Day of February, 2015

Michelle K. Lee
*Deputy Director of the United States Patent and Trademark Office*